Sept. 16, 1941.  L. V. LUCIA  2,256,398
PARKING METER
Original Filed March 4, 1936    3 Sheets-Sheet 1
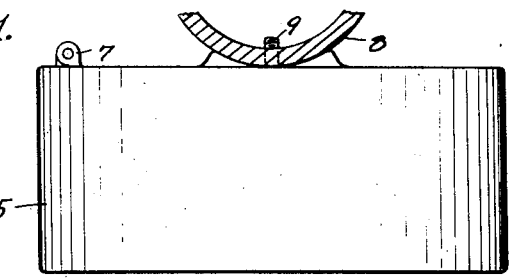
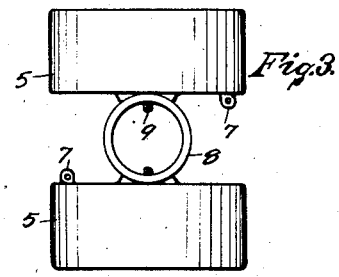
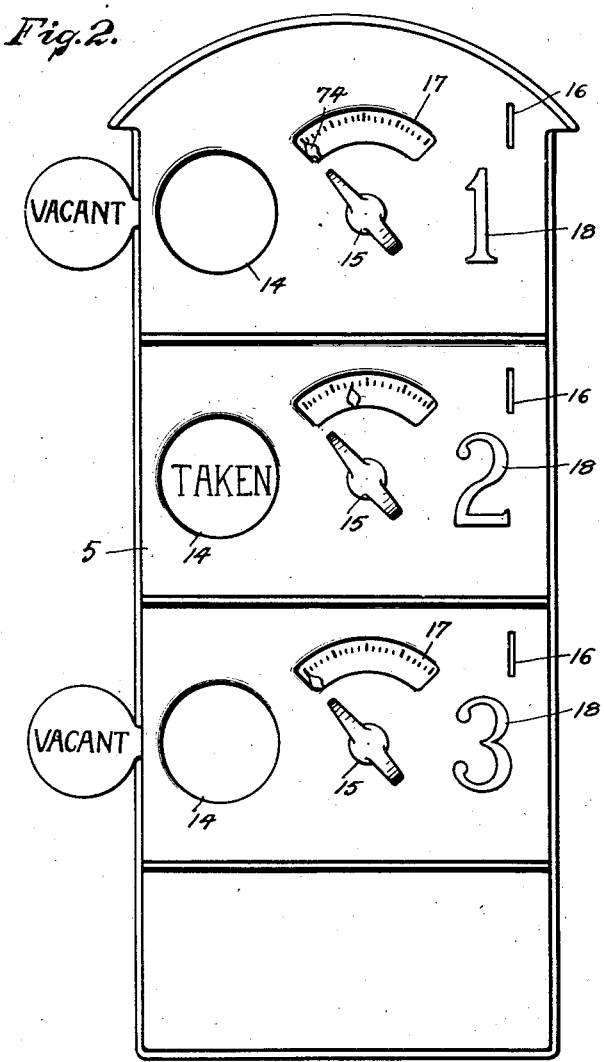
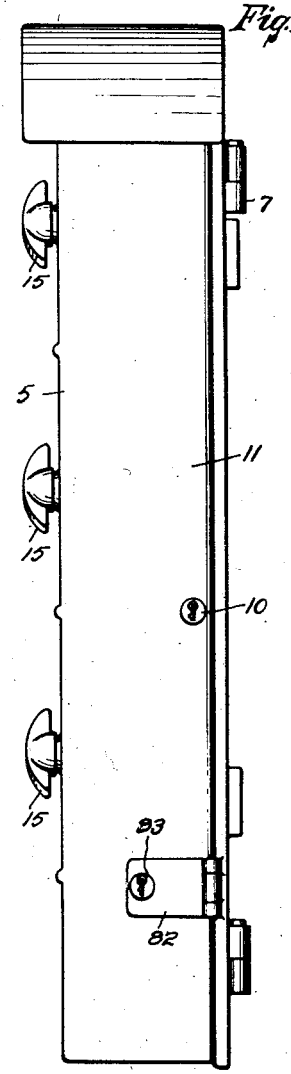
INVENTOR:
Louis V. Lucia

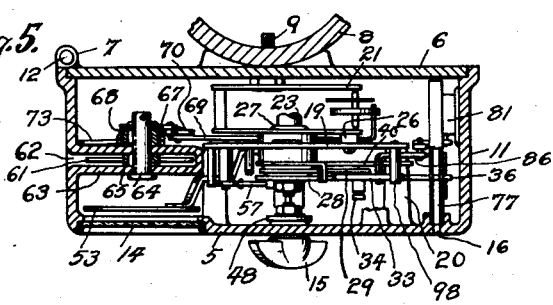

Sept. 16, 1941.   L. V. LUCIA   2,256,398
PARKING METER
Original Filed March 4, 1936   3 Sheets-Sheet 3
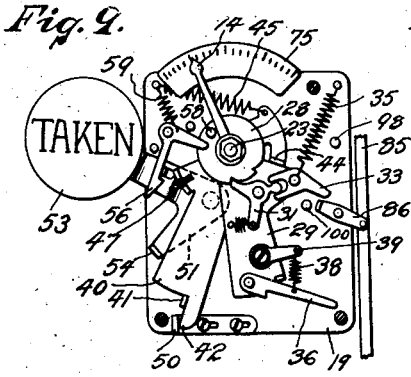
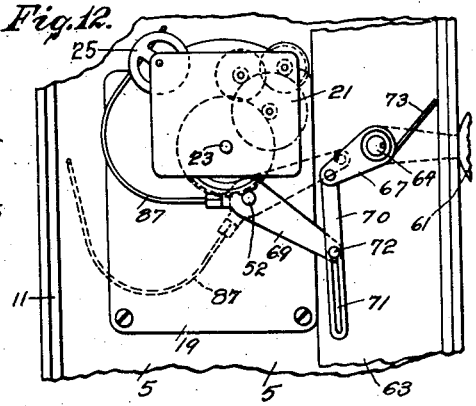
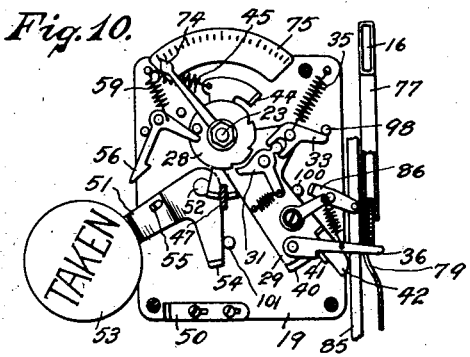
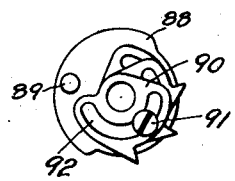
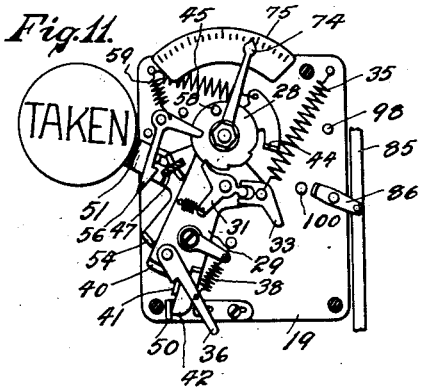
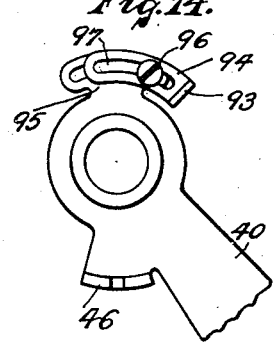
INVENTOR:
Louis V. Lucia Patented Sept. 16, 1941

2,256,398

UNITED STATES PATENT OFFICE 2,256,398

PARKING METER

Louis V. Lucia, West Hartford, Conn., assignor to The Standard Meter Corporation, Hartford, Conn., a corporation of Connecticut Application March 4, 1936, Serial No. 67,029
Renewed January 12, 1940

4 Claims. (Cl. 194—73)

My invention relates to a device such as a parking meter for regulating the parking of automobiles and like vehicles in restricted areas.

It has been found, by careful survey, that the general public does not object to paying for parking in restricted areas of a city or municipality if the time period required is sufficient to warrant the said payment. They do object, however, to paying for the privilege of parking a short time such as would be required to enter a store or a bank in order to carry out some brief business transaction.

It is an object of my invention, therefore, to overcome such objections by providing a parking meter which is constantly in condition to be operated or, in other words, to render a certain period of time for free parking without requiring payment and which can also be operated to render a relatively longer period of time when a payment is made for the operation thereof such as by means of inserting a coin or check.

A further object of my invention, is to provide a parking meter which will indicate when an area, under control of the machine, is being occupied either in violation of rules or for longer than the time period allowed either free or for a specified charge.

A further object is to control the parking of automobiles in restricted spaces along the sides of city streets, in which the parking of automobiles is permitted only for a specified period of time, by indicating when a vehicle is parked illegally; either for the reason that the allowed period of time has elapsed or that the owner has not paid for the privilege of parking.

A further object of my invention, is to provide such a machine which will collect revenue for the privilege of parking in a restricted area.

A still further object of this invention is to provide a parking meter which can be set, without payment, to operate for a free period of time and which must be set with a coin, as payment, to operate for any period of time longer than the said free period.

Further objects of my invention will be clearly understood from the following specification and from the accompanying drawings in which:

Figure 1 is a plan view, in elevation, of a parking meter embodying my invention.

Figure 2 is a front view thereof.

Figure 3 is a plan view, on a reduced scale, illustrating the manner in which two of the said parking meters are attached to a single supporting pole.

Figure 4 is a side view, in elevation, of my improved parking meter.

Figure 5 is a plan view of the same, partly in section on line 5—5 of Figure 6. A portion of the mechanism being omitted to simplify the illustration.

Figure 6 is a front view thereof, partly broken away to illustrate the operating mechanism.

Figure 7 is a fragmentary detail view, in section, illustrating the construction of the hinges for the door thereof.

Figure 8 is a side view, broken away to illustrate certain portions of the operating mechanism.

Figure 9 is a front view of the main unit of the operating mechanism, showing the operation thereof when setting the parking meter for a free period of time.

Figure 10 is a similar view, showing the first step in the operation thereof for setting the said meter for a longer period of time with the use of a coin or check.

Figure 11 is a similar view, illustrating the next step of the said operation.

Figure 12 is a rear view, showing the means for operating one of the signals and for starting the timing mechanism.

Figure 13 is a front view, illustrating a modified form of the time setting ratchet disc.

Figure 14 is a front view, illustrating a modified form of the operating lever to provide adjustable means thereon.

My improved parking meter comprises a casing 5 which is mounted upon the back plate, or door 6, by means of hinges 7 that extend from said casing and door. The door is mounted upon a suitable supporting post 8 by means of bolts 9. A lock 10, of a suitable type is provided in the side walls 11 of the casing 5 for locking said casing to the door 6. The hinges 7 are provided with hinge pins 12 which are removable but may be locked in said hinges by means of screws 13 that are threaded to that portion of the hinge which extends on the door 6. This construction provides a means whereby the entire parking meter may be mounted to a support in such a manner that it cannot be removed therefrom by anyone, other than the person possessing the key to the lock 10, for the reason that the door is secured from the inside by the bolts 9 and, therefore, the casing must be opened with the key to permit access to the bolts 9. Furthermore, the hinge bolts cannot be removed, in an attempt to remove the casing from the door, since when the casing is locked, the locking screws 13 cannot be reached as they are covered by the hinge portions which extend from the side 11 of the casing.

The said casing is provided with signal windows 14 through, each of which, shows a signal member as will be hereinafter described.

An operating handle 15 is mounted in the face of the said casing and a coin slot 16 is also provided therein. If desired, a time indicator which will show through a window 17 may also be provided, although the use of the same is optional.

The parking meter illustrated in the drawings comprises three separate units, each of which is entirely independent of the others in its operation excepting that certain elements of the invention are co-related with all of the said units.

Considerable advantage is obtained by thus grouping a plurality of parking meter units in a single casing; inasmuch as a single parking meter casing will cover a plurality of parking spaces along the side of a street, thus diminishing the number of poles which would be necessary where each meter is constructed as a single unit. In some cases, this feature of my invention also serves to eliminate entirely the use of supporting poles as, in the majority of streets, there are already erected the standard telegraph or electric light poles which are spaced at approximately the proper distance to accommodate six vehicles. In such cases, my improved parking meters may be constructed as a triple unit and installed, one at each side of a pole, as illustrated in Figure 3. Each meter would cover the three parking spaces nearest to it on that side of the pole; thus, one pole would serve six parking spaces. Of course it will be necessary in some cases, on account of the limitation of some parking spaces, to provide parking meters with single or double units.

Multiple meters are provided with numbers, such as indicated at 18, and which correspond with the numbers that may be marked at the side of the parking spaces nearest to the meter in order to associate each of the meter units with the parking space which they cover.

Each of the said meters is operated by a similar mechanism which comprises a plate 19 that is mounted upon bosses 20 extending inwardly from the front of the casing. A timing device 21 consisting of a suitable clock mechanism commonly comprising a main spring 22 which rotates a main shaft 23, the rotation of which is controlled by a gear train 24 by the operation of a balance wheel 25, is mounted upon the back of said plate 19 and spaced therefrom by means of bosses 26.

The said main shaft 23, of the timing device, extends through a supporting sleeve 27 which is mounted in one of the side plates of the timing mechanism and projects through an opening in the plate 19 to the opposite side thereof.

A ratchet disc 28 is secured to the front end of the said main shaft for rotating the same to wind the main spring 22. A winding lever 29 is rotatably mounted upon the supporting sleeve 27 by means of a sleeve 30 which provides a suitable bearing for keeping the said winding lever in alignment with the other members of the mechanism. A pawl 31 is pivotally mounted upon said winding lever and is moved to engage the said ratchet by means of a spring 32. A lever 33 is also pivotally mounted upon the said winding lever, by means of a stud 34, and is in operative engagement with the pawl 31.

A spring 35 is secured at one end to the plate 19 and at its other end to the said stud 34 for retaining the said winding lever in a normal position.

A coin operated pawl 36 is mounted near the end of the said winding lever 29 and held in normal position, against the stop 37 upon the said winding lever by a spring 38 which is anchored to an extension 39 that is adjustable on said winding lever and, by means of which the tension of the said spring 38 may be adjusted to provide for the operation of the pawl 36 by the weight of the required coin.

An operating lever 40 is rotatably mounted upon the supporting sleeve 27, over the sleeve 30, thereon, and is provided, at its lower end, with a detent 41 and a stop extension 42 and, at its upper end, with an extension 43 having an operating finger 44 thereon. The said operating lever is retained in its normal position by means of a spring 45 which is connected, at one end, to the extension 43 and, at its opposite end, to the supporting plate 19. The said operating lever 40 also has another extension 46 which is notched to receive a finger 47 from a lever 48 that is secured to a stud 49 extending from the operating handle 15 and which is rotatable in the front wall of the casing 5.

A stop 50 is adjustably mounted upon the supporting plate 19 in position to engage the stop extension 42 of the lever 40.

A bell crank lever 51 is pivotally mounted upon the said supporting plate 19, by means of a stud 52 which may extend through the said supporting plate. The said lever carries, at one end thereof, a signal plate 53 and has at its other end an operating finger 54. It is also provided with a detent 55 adapted to be engaged by a pawl 56 which is also mounted on the said supporting plate and has a finger 57 projecting in the path of movement of a stud 58 upon the ratchet disc 28. A spring 59 is provided for applying unidirectional motion to said pawl towards a stop 60.

If desired, an external signal member 61 may be provided for showing a signal outside of the casing in order to make the same more conspicuous from a distance. This signal member may be contained within a groove 62, which is formed, in the side of the casing 5, by means of an inwardly extending portion 63, and mounted in said groove by means of a shaft 64 which extends thru the walls of the said groove 61 and is keyed to a hub 65 on an arm 66 extending from the said signal member. The same said signal member may be operated by means of a lever 67 which has a hub 68 that is keyed to the shaft 64 and is operated by means of a lever 69, through a connecting bar 70 which is pivoted to the end of said lever 67 and has a slot 71 through which the stud 72 at the end of the said lever 69 extends. The said signal plate 61 is moved to, and retained in, its raised and normal position by means of a torsion spring 73 which is mounted upon the hub 68.

If desired, means may also be provided for indicating the amount of time allowed for parking as well as that remaining from said allowed time. The said means may comprise an indicating pointer 74, which may be mounted over the ratchet disc 28 to be rotatable with the main shaft of the timing device, and a dial plate 75 which is supported on a bracket 76 extending from the supporting plate 19.

A coin chute 77 is provided inside of the casing 5 and extends from the coin slot 16 downwardly to the coin operated pawl 36. This coin chute may be supported upon the casing in any suitable manner, such as by means of a bracket 78, and has a slot 79 in one of the said walls thereof to receive the end of the said coin operated pawl 36; the said side wall extending downwardly as at 80 and being offset to guide the coin past the coin chute of the unit below.

It may be desirable in some cases to provide means, such as a counter, for counting the number of coins that have been collected in the said parking meter and to have the said counter so arranged that it can be inspected only by an authorized person who is in possession of the proper key. For this purpose I provide a counting meter 81, of a suitable type, which is mounted to the inner side of one of the side walls of the casing 5 and in a position where the indicating numbers of the said meter will show through an opening that is covered by a separate door 82 which is locked by a suitable lock 83.

The said meter commonly comprises an operating lever 84 which I connect, by means of a bar 85, to a meter operating lever 86 that is pivoted upon the supporting plate 19 and operated as hereinafter described.

It may also be desired to provide means for insuring the starting of the timing mechanism, when the operating handle 15 is turned to start the operation of the parking meter. I, therefore, provide a wire spring member 87 which extends from the lever 69 and engages the balance wheel 25 of the timing mechanism, to start the movement thereof.

In the modified form of the ratchet disc, as illustrated in Figure 13, I provide a disc 88 upon which the stud 89 is mounted for operating the finger 57 of the pawl 56. A plurality of toothed members 90 are adjustably secured to said disc by means of a screw 91 which extends through the slots 92 therein in order to provide means whereby the teeth on said ratchet disc may be adjusted to vary the time periods controlling the operation of the said parking meter.

In the modification of the operating lever 40, illustrated in Figure 14 of the drawings, I provide an adjustable finger 93 which extends from a bar 94 that is adjustable on an extension 95 by means of a screw 96 which extends through a slot 97 in said bar and is threaded into said extension.

The operation of my improved parking meter is as follows:

Assuming that a driver wishes to park his vehicle in a vacant parking space which is restricted and controlled by my improved parking meter of the multiple type above described; he parks his vehicle in the parking space and then operates that unit of the parking meter which corresponds to the number thereof. The said unit will then be in the position of the lowermost unit illustrated in Figure 6. If he wishes to park for a short period of time, and which is within the free period allowed in that particular parking zone, he simply turns the operating handle 15 to the right. This turn of the handle will, through the detent 47 on the lever 48, impart a rotating motion to the operating lever 40 towards the position illustrated in Figure 9. When a portion of the said rotating motion has been expended, the finger 44 will engage the edge of the winding lever 29 causing the same to move with the lever 40 and carry the lever 33 away from the stop pin 98; thus causing the pawl 31, by means of the spring 32, to engage the notch 99 in the winding ratchet disc 28, and rotate the said disc for the proper distance to wind the main spring 22 of the clock mechanism, through the shaft 23, for operating the time mechanism for the length of the free time period. Movement of the lever 40 will stop upon the engagement of the extension 42 thereon, with the stop 50, at which time the said lever will have raised the signal plate 53, by its engagement with the finger 54, to the position indicated in said Figure 9 wherein the said signal plate shows through the window 14 in the front of the casing 5. When the operating handle 15 is released, both the operating lever 40 and the winding lever 29 will be returned by means of the springs 35 and 45, to their normal position against the stop pin 100. The bell crank lever 51, having then been released by said levers, will be retained in its raised position by means of the pawl 56 through its engagement with the detent 55. When the said winding lever has returned to its normal position, the lever 33 will engage the stop 98 and move the end of the pawl 31 away from the ratchet disc 28; thus permitting rotation of said disc without interference by said pawl. The main spring 22 of the timing mechanism will, thereafter, rotate the said ratchet disc towards its normal position until the allowed time period has expired and the stud 58 engages the finger 57 of the pawl 56 and trips the said pawl; causing it to release the detent 55 and permit the bell crank lever 51 to drop downwardly, by force of gravity, to its normal position against the stop 101 and thus remove the signal from the window 14; indicating that the parking period has expired.

It is evident that due to arrangement of parts and sequence of operation as described above, a person who wishes to park his vehicle for only a short period of time may park free, since my improved parking meter is normally constantly adapted to be operated without payment to indicate a limited predetermined period of time.

However, a person wishing to park his vehicle for longer than the free time period, may render the meter operable to permit parking for a longer, or paid, period of time by means of a payment which he makes by inserting a coin or check in the coin slot 16. The said coin will drop through the coin chute 77 and rest upon the end of the pawl 36 as clearly illustrated in Figure 10 of the drawings. The said pawl will be forced downwardly, by the weight of the coin, and into engagement with the detent 41 upon the operating lever 40; thus locking the said lever to the winding lever 29. When the said operating lever 40 is then operated by means of the operating handle 15, it will move the winding lever 29 with it, for the full distance of its stroke, to the position illustrated in Figure 11. The winding ratchet disc 28 will then have been turned for a further distance than it is turned for a free parking period. It will then naturally require a greater length of time for it to return to its normal position, at which the signal is dropped, and thus a longer time period is provided in compensation for the coin which has been deposited.

After the coin has been deposited on the pawl 36, movement of the winding lever, to start the operation of the timing meter, will also withdraw the pawl from the coin chute and allow the coin to drop down into the coin box 102 of the casing 5.

Operation of the bell crank lever in raising the signal plate will also operate the lever 69 which is connected to the same stud 52 but at the back of the supporting plate. This lever will lower the external signal 61 and also move the spring extension 87 thereon across the escapement wheel 25 of the timing mechanism; thus insuring the starting of the timing mechanism for the operation of the parking meter.

Recording of the number of coins received in each box is accomplished in the following manner:

It will be noted that when the mechanism is moved to the position illustrated in Figure 9 of the drawings, in order to set the meter for a free parking period, the lever 33 will not have moved far enough to engage the lever 86 and, therefore, the operation of the meter is not recorded on the recording meter 81. However, when a coin is deposited in the meter for a paid time period and the mechanism is operated, it will move to the position illustrated in Figure 11 of the drawings thereby carrying the lever 33 past the lever 86 so that the latter lever will be rocked on its pivot by the lever 33. This will raise the bar 85 which, in turn, will rock the recording lever 84 on the recording meter 81 and register the coin. It will, therefore, be seen that the recording meter will register only the number of operations applied to the meter for which a coin is deposited therein and not those for which the meter is operated for a free time period.

When the lever 33 contacts with the lever 86, as it is being moved back to its normal position, it will simply swing back against the tension of the spring 32 without moving the said lever 86.

The time indicating dial 75 is provided only when desired to indicate the amount of time that the meter will operate. Thus, assuming that the time allowed for the free parking period is ten minutes; upon the starting of the parking meter without first depositing a coin, the indicating pointer 71 will move to the position on the dial indicating ten minutes and then slowly move back, with the ratchet disc 28, toward its normal position. If the time period allowed for a paid parking period is one hour, the said indicator will point to one hour upon starting the operation of the parking meter.

It will be noted that the ratchet disc 28 is provided with more than one tooth which can be engaged by the pawl 31. This is also an optional feature in my device and is intended to provide means whereby, if desired, the parking meter can be set to give more than one parking period in the following manner.

After one coin is deposited and the meter is wound in the position indicated in Figure 11, which might be for one hour, the winding lever is allowed to return to its normal position by releasing the operating handle 15. Another coin is then deposited and the winding lever again operated in the same manner as at first. This time the pawl 31 will engage the next tooth 99 on the ratchet disc and move the said disc still further around; thus winding the timing device for a longer time period. This operation may be repeated and the timing device may be wound to set the parking meter for any number of time periods, by depositing a coin, one after the other, according to the number of the said teeth which are provided on the ratchet disc 28.

The said time periods may also be varied as desired by the use of some adjustable means such as shown in Figure 13 to take the place of the ratchet disc 28. The time allowed for the free parking may also be varied, if desired, by making the finger 44 adjustable upon the operating lever, as illustrated in Figure 14 of the drawings. Adjustment of the time periods for accuracy may be done by means of the adjustable stop 50.

It will thus be understood that, when a person parks his vehicle, he is obliged to operate the parking meter and the said meter will indicate that the parking space with which it is associated is occupied legally. This may be done either by the color of the signal showing through the window 14 or by indicia thereon such as the word "Taken." When the time period allowed has expired, the said signal will drop out of sight and expose in place thereof, a different color. If desired, the word "Vacant" may be shown in place of the word "Taken." This different color, or word, can be applied upon the front surface of the inward extending portion 63 or it may show upon a separate plate which can be supported directly in back of the signal plate 53 so that, when the said signal plate drops down out of sight, it will expose the signal directly in back of it.

The external signal may be used when desired. The same is not necessary, however, except in some cases where it may be desired to have a signal showing clearly from the outside of the device to indicate that a parking space is vacant or illegally occupied and so that it can be clearly seen from a distance by an inspector or an officer.

From the above description and drawings, it will be clearly understood that I have provided an improved parking meter which may be constructed either in multiple or single units and, when in multiple units, so arranged that one coin box will serve all of the different units in the same casing and one coin recording meter is operated by each of the said units so that the matter of installation of these meters is greatly simplified, economy is obtained in the construction thereof and labor in the attendance thereof is reduced to a minimum.

It is desired to have it understood that although I have illustrated such features as the time indicating means, external signal, and the coin counting meter, these may or may not be used, depending upon the service desired from the parking meters.

I claim:

1. A device of the character described comprising a signal, a timing device for operating said signal after a period of time depending upon the extent to which the said timing device is wound, a normally operable lever adapted to wind said timing device to a certain extent, a second lever adapted to wind said timing device to a greater extent, and a coin controlled member adapted to connect the said second lever for operation with the said normally operable lever.

2. A parking meter having a movable signal, timing mechanism for causing movement of said signal, timer setting means for said timing mechanism, manually actuated means cooperable with said timer setting means for setting the timing mechanism and normally operable to set it to operate said signal at the end of a relatively short free-time period, and coin controlled means associated with said setting means and connectable by a coin with said manually actuated means for causing operation of said setting means by said manually actuated means to set the timing mechanism for its operation of the signal at the end of a relatively long pay-time period.

3. A free-time, pay-time parking meter having a signal, timing mechanism for operating the signal selectively at the end of a relatively short free-time period or at the end of a relatively longer pay-time period, manually actuated means for setting the timing mechanism and normally operable to set it for the relatively short free-time period, and coin controlled means associated with said manually actuated means for causing its operation to set the timing mechanism for the relatively longer pay-time period.

4. A parking meter comprising a movable signal, timing mechanism for operating said signal after a period of time depending on the extent to which it is wound, manually actuated means for winding said timing mechanism to a limited extent and normally operable to wind said timing mechanism through part only of its movement, and coin controlled means connectable by a coin with said manually operable means to wind said timing mechanism through a greater part of the movement of said manually actuated means.

LOUIS V. LUCIA.